Feb. 21, 1956 D. H. GRIDLEY 2,735,936
DEFLECTED BEAM TUBE BINARY ADDER
Filed July 13, 1950 6 Sheets-Sheet 1

INVENTOR
DARRIN H. GRIDLEY

BY
ATTORNEYS

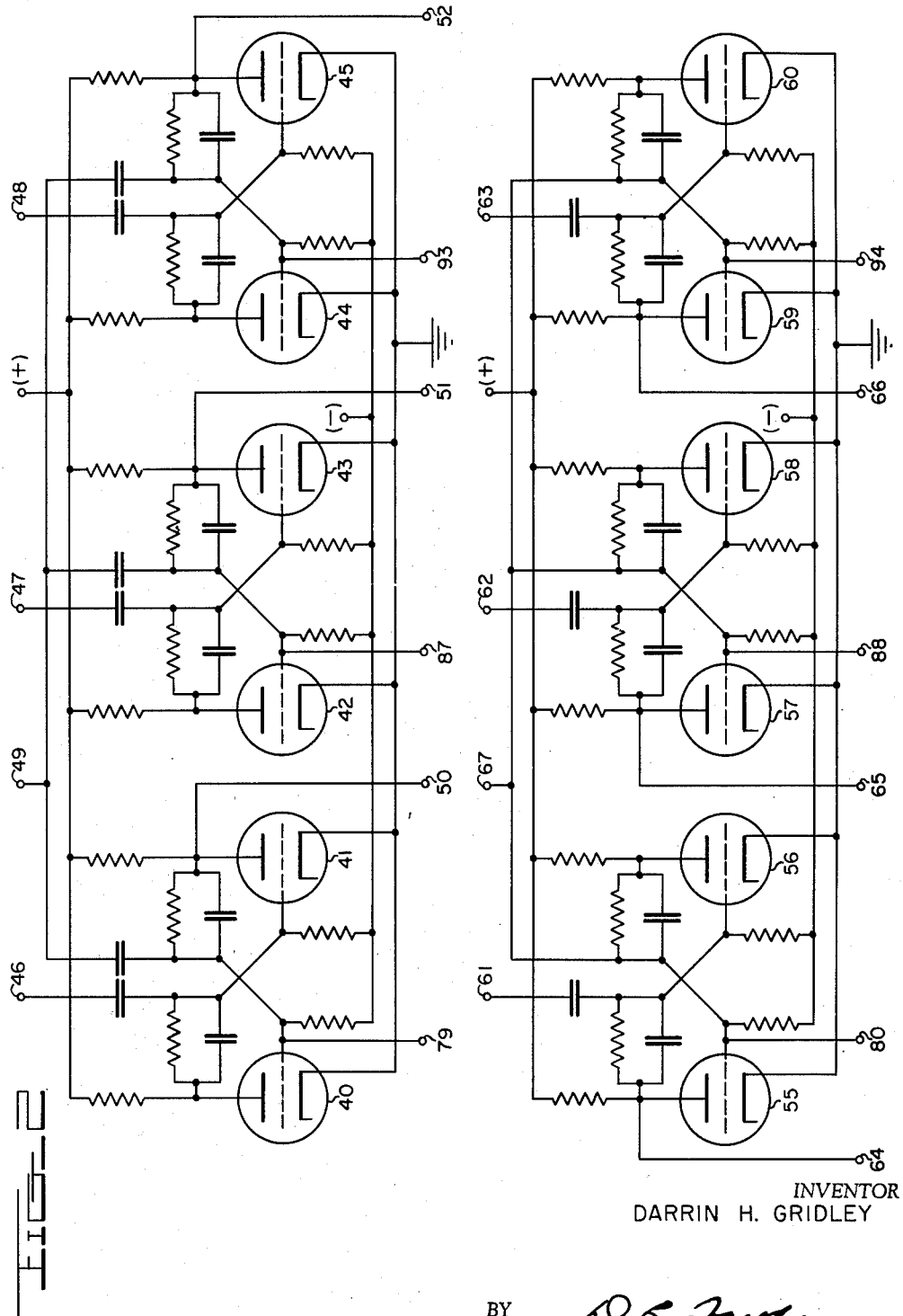

Feb. 21, 1956   D. H. GRIDLEY   2,735,936
DEFLECTED BEAM TUBE BINARY ADDER
Filed July 13, 1950   6 Sheets-Sheet 3
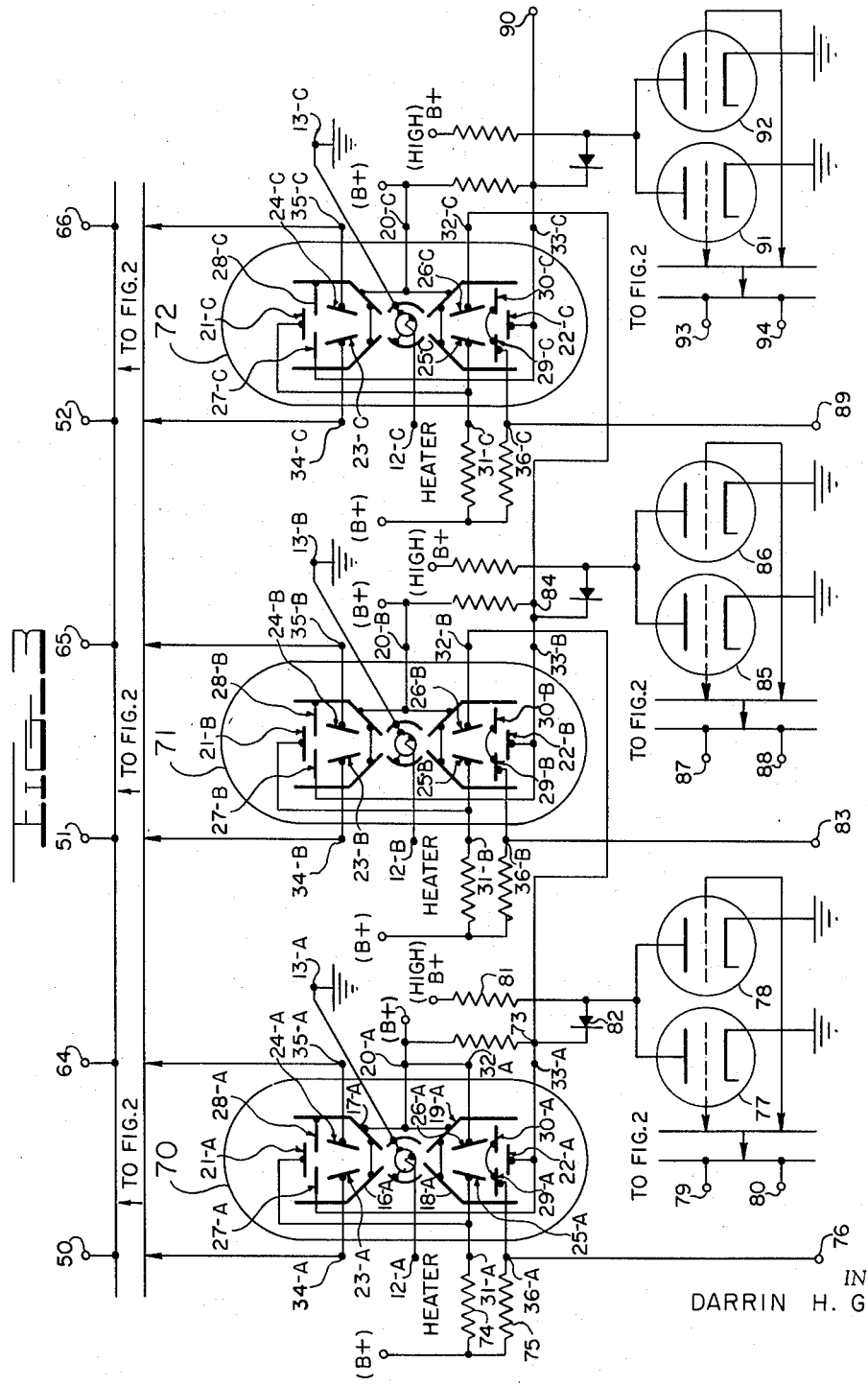
INVENTOR
DARRIN H. GRIDLEY
BY
ATTORNEYS FIG_4
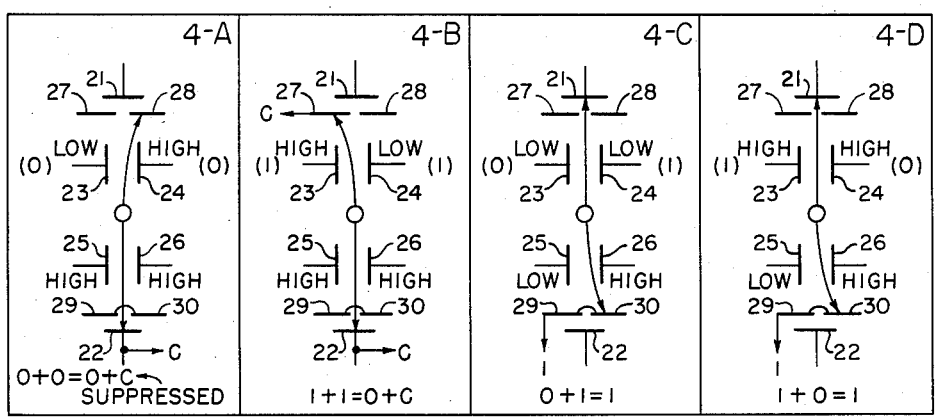
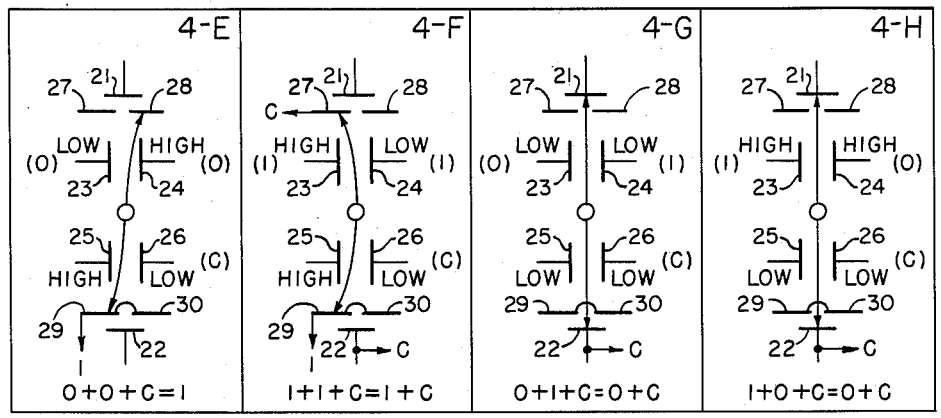

Feb. 21, 1956   D. H. GRIDLEY   2,735,936
DEFLECTED BEAM TUBE BINARY ADDER
Filed July 13, 1950   6 Sheets-Sheet 5
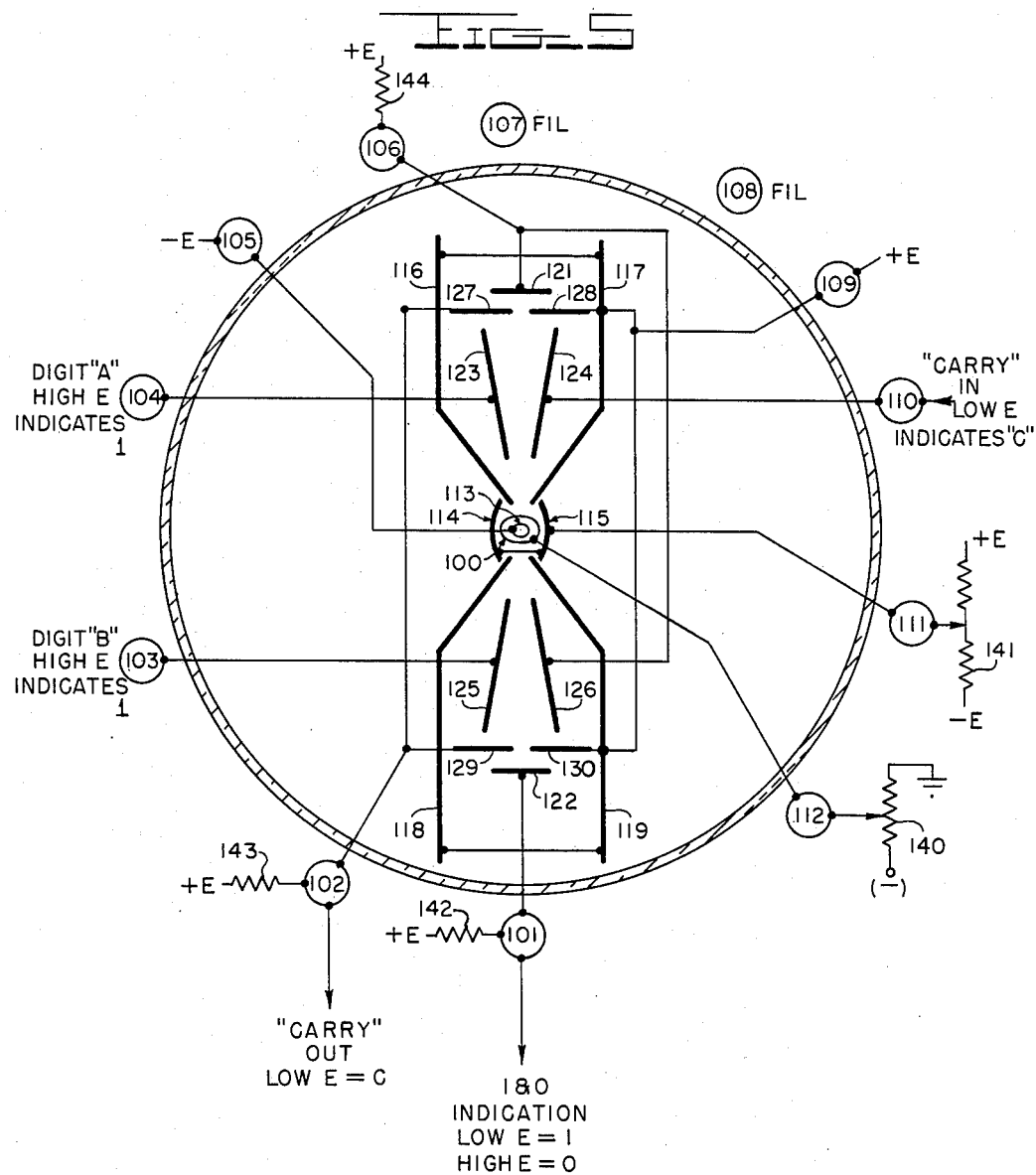
INVENTOR
DARRIN H. GRIDLEY
BY
ATTORNEYS

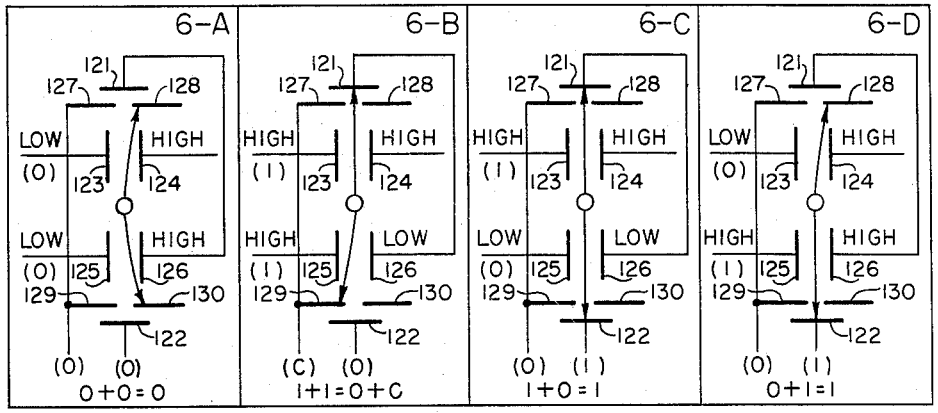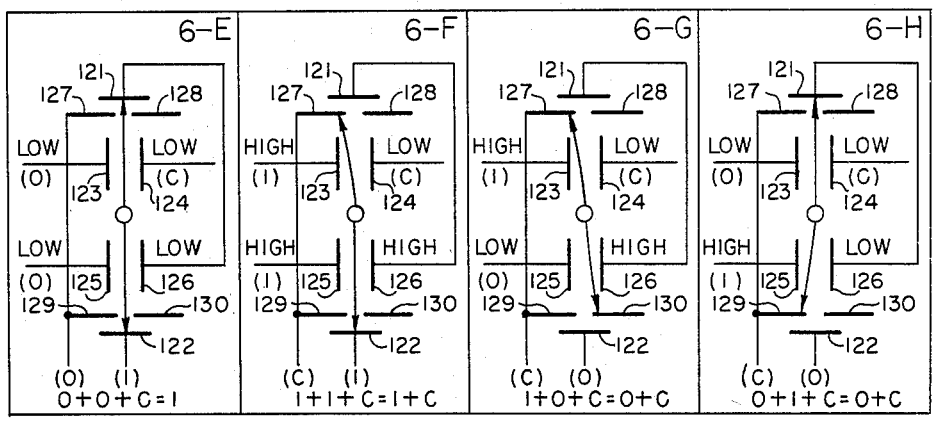

United States Patent Office 2,735,936
Patented Feb. 21, 1956

2,735,936

DEFLECTED BEAM TUBE BINARY ADDER

Darrin H. Gridley, Washington, D. C.

Application July 13, 1950, Serial No. 173,638

6 Claims. (Cl. 250—27)

(Granted under Title 35, U. S. Code (1952), sec. 266)

This invention relates to electronic computer systems in general and in particular to an improved electron tube structure and circuits therefor for performing certain mathematical operations such as adding quantities contained in values of binary digits, and providing coincidence indications.

In electronic computer and calculator operations it is frequently desirable to add quantities contained in values of binary digits. At the present time such operations can be carried out but they are done only with circuits of great complexity requiring typically 5 to 13 conventional type electron tubes or combinations of vacuum tubes and numerous crystal diodes for each binary digit. Where operations require a large number of binary digits, as practically all must, fantastic quantities of electron tubes are required in the overall apparatus. Such great complexity not only has disadvantages with regard to initial cost, space requirements and power consumption but also opens a great possibility of error due to tube failure.

The addition of binary digits is not entirely the simple matter of adding 2 and 3 to get 5 or the like. Binary digits have only two possible values which may be designated 0 and 1. In binary addition, the values 0 and 0 may be added to give 0. 0 and 1 may be added to give 1, and 1 and 0 may be added to give 1, while 1 and 1 may be added to give 0 plus a "carry." This addition of 1 and 1 may be likened to a situation in the decimal addition system where the single digit numbers to be added produce a sum which cannot be represented with a single digit (in other words it produces a value of 10 or more). Thus a value is given in the digit position itself whereas also, a "carry" or a placement of a digit in the next higher position is also required. This addition is summarized in the following tabulation (for a single digit):

$$0+0=0$$
$$1+1=0+\text{"carry"}$$
$$0+1=1$$
$$1+0=1$$

In electrical manipulations binary digits are generally obtained by some form of a two-position switch, one switch position corresponding to one value, 0 for example, of a binary digit and the other switch position corresponding to the other value, 1, of the binary digit.

Electrical signals identifying the switch positions may be readily derived, for example, by causing the switch to provide a high voltage in one position and a low voltage in the other position. Many forms of electrical switches may be employed to provide the binary signals, or these signals may be transmitted pulses (1) or absence of pulses (0) in parallel time sequence on multiple transmission lines. For low speed operation mechanical or manually operated switches may in many instances be used, however the overall flexibility of electronic switches makes them ideally suited to calculation operations, a separate switch being used for each binary digit. The usual type of electronic switch employed in operations of this type is a trigger circuit of the bi-stable variety such as the Eccles-Jordan trigger circuit. Either stable state may be realized upon application of appropriate input signals and steady potentials of either high or low values or reverse polarities, representative of the binary values 0 and 1, may be realized at appropriate points in the circuit in each state.

An appropriate number of binary digits must be provided to handle the largest quantity to be added. Since binary digits can have only two values, this generally results in quite a few binary digits for even small (decimal) quantities. For example, five binary digits are required for numbers up to the decimal system number of 32, six for numbers up to decimal 64, seven for numbers up to decimal 128, and so on.

One switch or trigger circuit is required to represent each binary digit, with the overall group usually called a counter if the stages are connected in cascade or a register if the circuits are in parallel. As herein employed, there is little difference between a register and a counter, the same variety and quantity of binary circuits generally serving for the same number of digits in each. The difference lies mainly in the source of signal for each stage. In a counter the stages are connected in cascade, with a single input to the first stage of the cascade that is, the first stage receives a series of input signals, altering condition with each to provide output signals for the succeeding stage in the cascade at half of the original input frequency. Such a counter can, therefore, accept a non-simultaneous group of signals in a single line and convert them into a plurality of simultaneous binary signals in separate lines. A register functions more as a storage device, receiving separate binary type input signals for each stage in separate lines, the signals being either simultaneously existent or not, to hold them for a finite period of time. For uniformity, the designation "register" will be used throughout the following discussion, however it will be understood that the word is used broadly to include a counter or other forms of binary signal generation or retention devices as well.

In many present day measuring and calculating devices information is already available from such register devices, however, the presently available auxiliary circuitry for analyzing information, in particular for adding binary numbers contained in separate registers, leaves much to be desired.

It is accordingly an object of the present invention to provide an electron tube structure capable of combining signals applied thereto.

Another object of the present invention is to provide an electron tube structure for performing binary digit additions.

Another object of the present invention is to provide an electron tube particularly suitable for indicating coincidence or correspondence between a plurality of input quantities.

Another object of the present invention is to provide an electron tube structure for combining purposes which structure is suited for long-life construction.

Another object of the present invention is to provide an electron tube structure for combining purposes in which a grid or other flimsy electrode is not required in close proximity to the cathode electrode.

Another object of the present invention is to provide an electrical circuit employing the foregoing tube structure to perform the mathematical operation of "adding" quantities contained as binary digits.

Other and further objects and features of the present invention will become apparent upon a careful consideration of the accompanying drawings and the following detailed description.

Fig. 1 shows a partly cut-away side view of a tube constructed in accordance with the teachings of the present invention.

Fig. 1–A shows a cross sectional end view, partly schematic, of a tube structure constructed in accordance with the teachings of the present invention. This figure is primarily a schematic diagram to show general element placing, interconnections, and operational requirements and is not to be considered as showing ideal relative sizes and exact element placement.

Fig. 2 shows two register circuits for receiving binary input signals and retaining them for a finite period of time.

Fig. 3 shows an adder circuit embodying the principles of the present invention.

Fig. 4 shows various beam direction combinations achieved in various addition combinations.

Fig. 5 shows an alternate arrangement of the interconections of the tube elements to provide operation wherein the erroneous "carry" signal in the (0+0) addition is not given.

Fig. 6 shows beam direction combinations for the tube structure interconnected as in Fig. 5.

In accordance with the principles of the present invention two electron tube structures are provided which possess applications in many types of electronic equipment. In greater detail, the invention also includes electrical circuitry in which the new electron tube structures are employed. The circuitry is particularly suited for carrying out the addition of binary numbers, however it is not limited only to this type of operation.

Figure 1A:
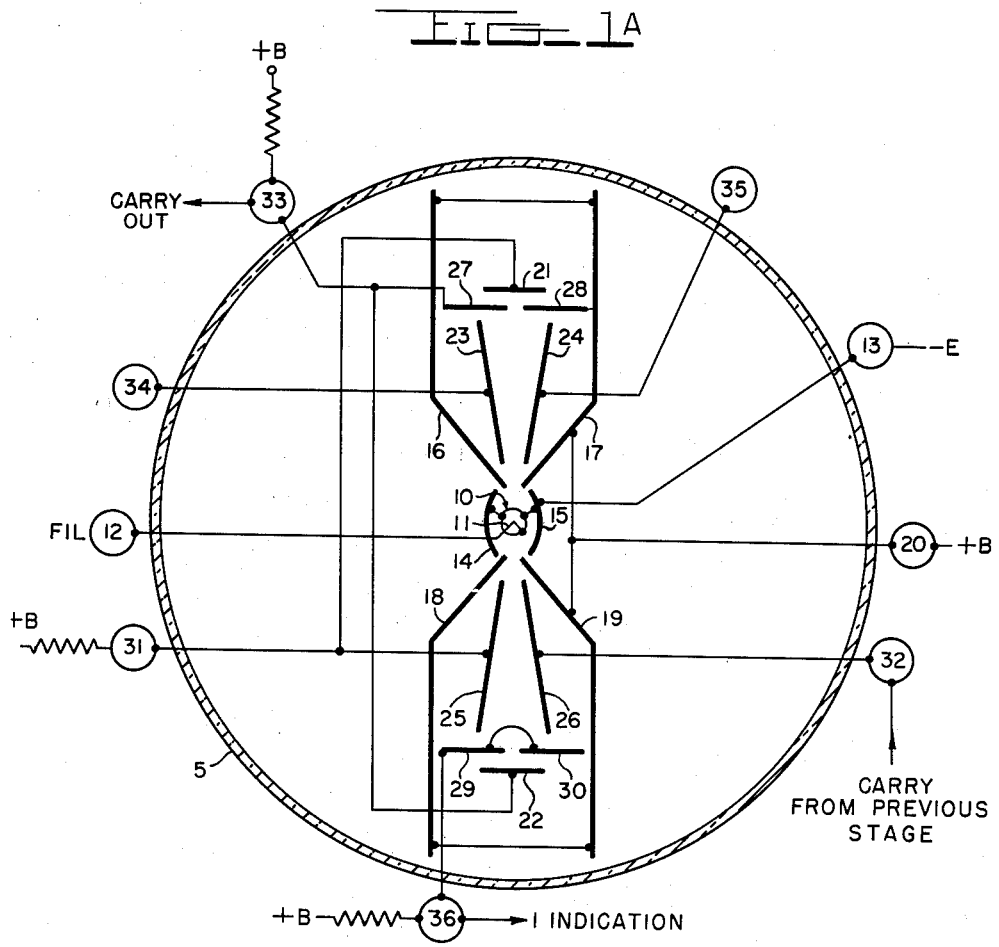
Figure 1:
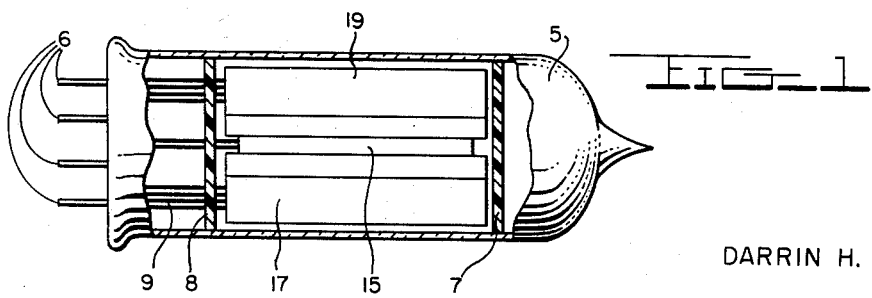

One tube structure as exemplified by Fig. 1–A employs dual directed electron beams. The other tube structure (of Fig. 5) is also a dual beam affair but possesses certain advantages over the tube of Fig. 1–A which will be described later. To produce and direct the beams, the structure of Fig. 1–A has an electron source such as a heated cathode, beam forming plates, beam deflecting means and electron collector anodes disposed so as to form a pair of beams each of which will travel to any one of three collector anodes in accordance with signals applied to the deflection means. These anodes include for each beam a central collector anode and first and second offset collector anodes placed to each side of the central collector anode. The entire assembly is mounted within an evacuated envelope.

In the circuit of Fig. 3 the dual electron beam tube is employed to perform the addition of two numbers contained as binary digits. A first electron beam is provided with input deflection signals dependent upon the binary numbers to be added. These signals are applied to the deflection means and operate upon the first beam so that it is undeflected for the addition of (1+0) or (0+1) and is therefore collected by the previously mentioned central collector anode, so that it is collected by a first offset collector anode in the addition (0+0), and is collected by a second offset collector anode in the addition (1+1). The addition (0+0) gives 0, (1+0) and (0+1) gives 1 and (1+1) gives (0+carry). Therefore, current flow to the central collector provides an output indication of (1), current flow to the first offset collector an indication of (0) and current flow to the second offset collector anode an indication of (0+carry).

The second electron beam receives "carry" signals, where such are given by a preceding stage, and adds them to the (1) indication from the central collector anode of the first beam device, operating in the same manner as the first beam. The additions involving a carry input from a preceding stage are (0+carry) which equals (1) and (1+carry) which equals (0+carry) this latter "carry" being an input signal for the succeeding binary stage.

The (1) signal from the first beam section's central collector anode is therefore not employed as a direct output signal but rather is employed together with an input "carry" to control the deflection of the second electron beam, to provide the output indication. The second beam is undeflected when it receives either an input "carry" from a preceding stage and an input (1) from the first beam or when it receives neither. In any other combination it is deflected and collected by one of the offset collector anodes. The final output (1) for the stage is given by current flow to either offset collector anode for the second beam and the output "carry" is given by current flow to the central collector anode for the second electron beam. In addition, of course, the previously mentioned "carry" given by current flow to the second offset collector anode for the first electron beam is also utilized as a "carry" output.

The circuit of Fig. 3 employs as many tubes of this new structure as there are binary digits to be handled and some other equipment which will be discussed in further detail at a later point in the specification.

With reference to Fig. 1 of the drawing, one embodiment of an electron tube structure of the present invention is shown having an envelope 5 which may typically be of an all glass or metal structure, having contact pins 6 protruding through the envelope thereof at one end. The wall is shown opaque in part which would be the case if the inside of a glass envelope were "silvered" by the getter or coated with some coating such as aquadag, however the central portion is cut-away to give an indication of the structure within the tube. This structure is pictured more readily in cross-section in other figures which will be described later in the specification. Parts visible in Fig. 1 include a cathode baffle 15, accelerating anode plates 17 and 19, mica disc element support 7, 8, and electrode leads 9 which are interconnected and go to the pins 6. The envelope and basing arrangement employed may be of any suitable form providing a suitable quantity of connecting pins.

A cross-section view of a tube in accordance with Fig. 1 as taken in a plane perpendicular to the plane of the elements is shown in Fig. 1–A. This figure although it indicates electrode structure and the enclosing envelope in general, is not of necessity drawn to scale and the pin numerical designations are shown outside the circle of the tube envelope whereas the correct location of the pins is within the circle of the tube envelope. In addition, the placement of the leads connecting the pins and the electrodes is in schematic form and electrode supports and spacers are not shown. Conventional methods of connecting, supporting and spacing the electrodes and pins familiar to those versed in electron tube manufacture would be entirely satisfactory.

The electrode assembly shown in Fig. 1–A produces twin electron beams which are deflected in accordance with input signals to provide the output binary digit indication (1) when such is appropriate and also to provide the "carry" indication when that is appropriate. The beams of electrons employed in the tube are to be contrasted with beams of the more familiar "pencil" type such as are commonly encountered in cathode ray tubes as they are made long in one dimension to increase the current capability thereof. The resulting beam therefore may be thought of as a ribbon of electrons.

Briefly described, the tube of Fig. 1–A has a centrally disposed cathode sleeve 10 which may be of conventional structure including an emissive coating, not specifically shown, and heated indirectly as by an internally located length of resistance wire 11, suitably insulated from the cathode sleeve. External connections 12, 13 are made to the wire 11 to supply heater power thereto. The cathode sleeve 10 is partly surrounded by beam forming plates or baffles 14, 15 which concentrate electrons from the cathode into two ribbons or beams.

The tube structure has four accelerating plates 16, 17, 18, 19, located in pairs substantially parallel to the electron beams. These plates are shaped and located to provide an accelerating field for the electrons emitted by the cathode. The pairs of accelerating plates are brought together to a very close spacing near the cathode so that a "lens" effect is obtained to assist in the concentration of the electrons into controllable beams. Within each pair of accelerating plates 16—17, 18—19 are located deflection plates 23—24, 25—26. The deflection plates straddle the appropriate electron "ribbon" to produce deflection thereof in accordance with deflecting potentials applied thereto quite similar to the deflection action in an electrostatically deflected cathode ray tube.

Located beyond the deflection plates for each electron beam is a series of collector anodes 21, 27, 28 and 22, 29, 30. These collector anodes are maintained at a positive potential with respect to the cathode and one of each group of three will collect one of the electron beams. The exact placement of these plates is not particularly critical however it is desirable that they be adequately spaced so that the undeflected beams will travel straight to the central collector anodes 21, 22, yet so the beams can be readily deflected to fall on one of the off-set collector anodes in the pairs 27, 28 or 29, 30.

The tube structure thus described contains a great number of electrodes requiring a large number of terminals for connections to external circuits. To minimize the number of external connections, and for applicant's immediate purpose many of the electrodes may be connected together internally. Such interconnections are shown in Fig. 1-A which have several desirable features for use in the binary adder circuit soon to be described. In Fig. 1-A, the cathode sleeve 11 and the cathode baffles are connected together and go to ground potential. Similarly the accelerating plates 16, 17, 18, 19 are connected together and to a positive potential at terminal 20. The offset collector anode 28 is also connected to the accelerating plates.

In addition to these connections, collector anodes 22 and 27 are connected together, as are collector anodes 29 and 30. Collector anode 21 is connected to deflection plate 25.

It is understood of course that the two beam units could be contained in separate envelopes with external connections, however, aside from basic considerations of size, there is a further reason for mounting the two units within the same envelope. This reason is the reduction of capacitances between the elements and to ground. The "ribbon" character of the electron beams prevents the attainment of high currents with small size, hence it is not as easy to obtain high frequency response as with high current electron tubes. Internal connections with short leads assist in the maintenance of low inter-electrode and electrode-to-ground capacitances.

With reference now to Fig. 3 of the drawings, a circuit is shown employing electron tubes of the type just described. This circuit is intended to perform binary addition, that is add numbers which are contained as binary digits. In the circuit of Fig. 3, one tube of the type of Fig. 1 is employed for each pair of binary digits to be added. Thus for adding two numbers each having typically three binary digits, three of the new tubes would be required, carrying in the circuit of Fig. 3 the numerical designations 70, 71, 72. In addition this circuit has the triode type "suppressor" electron tubes 77—78, 85—86, and 91—92 which will be described later. Correspondence between the numbering of Fig. 1-A and Fig. 3 is maintained, with suffixes -A, -B, -C being employed to indicate elements of the various tubes.

In the circuit of Fig. 3 certain tube electrodes are connected to positive supply potentials through resistances across which output signals may be developed. As an example for tube 70, terminal 31-A is connected to B+ through resistance 74, terminal 36-A for the two lower off-set collector anodes 29-A and 30-A to B+ through resistance 75 and terminal 33-A for the lower central anode 22-A and upper off-set anode 27-A to B+ through another resistance. Terminal 13-A for the filament and cathode is grounded, terminal 12-A for the filament goes to a source of heater potential, and terminals 20-A and 32-A for the accelerator plates and the lower deflection plate 26-A respectively go direct to a B+ potential.

This same type of external connection is followed for tubes 71 and 72 with the sole exception of deflection plate terminals 32-B and 32-C which are the "carry" input terminals and which connect to the carry output terminal of a preceding tube. Terminal 32-B of tube 71 is connected to collector anode terminal 33-A of tube 70 and deflection plate terminal 32-C of tube 72 is connected to collector anode terminal 33-B of tube 71.

Binary input signals for a first pair of digits to be added are applied to terminals 34-A and 35-A of tube 70 which connect to deflection plates 23-A and 24-A. These binary signals each can have two values (0) and (1) represented by a "high" potential or a "low" potential. For the input to terminal 34-A the binary (1) digit is given by a "high" potential and the binary (0) digit by a "low" potential. The input to opposite deflection plate terminal 35-A is exactly the opposite, digit (1) being represented by a "low" potential and digit (0) by a "high" potential.

The reason for the opposite potential requirements is not at once apparent but is a simple way of maintaining an output (1) for the addition (1+0) and (0+1), which are relatively reversed and will be discussed in detail at a later point in the specification.

The added binary output for the first digit is obtained at the collector anode terminal 76 across resistance 75. The value of (1) is represented at this terminal by a "low" potential while the value of (0) is represented by a "high" potential. The "carry" output signal is obtained at collector anode terminal 33-A and is given by a "low" potential at that point while a "high" potential at that point indicates the absence of a "carry." Tube 70, being allotted to the first or lowest order digit has no carry input.

Each of the circuits of tubes 71 and 72 for the higher order digits is almost identical to that of tube 70, receiving the same type binary inputs at terminals 34-B, 35-B and 34-C, 35-C, respectively, and providing binary output signals at terminals 83 and 89 and "carry" output signals at terminals 33-B and 33-C. In distinction, however, these tubes 71 and 72 receive "carry" input signals from the preceding tube (70 to 71) and (71 to 72) at the terminals 32-B and 32-C.

In operation, as a result of the interconnections employed in the tubes, the electron beams can assume various direction combinations indicative of the various possible input combinations. These are summarized in Fig. 4 to which reference is now made and since they include "carry" inputs, Fig. 4 in its entirety applies to tubes 71 and 72. For tube 70 which has no "carry" input, only the first four conditions 4-A, 4-B, 4-C and 4-D apply. The representations in Fig. 4 bear the same space relationships of right-left-up-down as the structure representations of Figs. 1-A and 3.

The representations of Fig. 4 will be described briefly with particular reference to the operation of one of the higher order digit circuits such as that of tube 71 or 72.

Fig. 4A shows the addition (0+0) the sum of which is (a). For this addition, the potential of plate 23 is "low" and 24 "high," so that the upper electron beam is deflected to collector anode 28. Both deflection plates 25 and 26 are "high," so that the lower beam is not deflected, being collected by anode 22. Such collection produces an erroneous "carry" signal at anode 22 (terminal 33-B or 33-C) which can easily be suppressed by auxiliary circuits which will be described later or which error is entirely absent in the tube structure of Fig. 5 which will be described later. The output value of (0) is given by the "high" potential at collector anodes 29, 30

(terminal 83 or 89) because of the absence of current flow thereto.

Fig. 4-B shows the addition of (1+1) which gives (0+ carry), and addition similar to the decimal addition (5+5) which gives (10) or (0) in the added digit plus a (carry) to the next digit. The addition (1+1) is brought about with deflection plate 23 "high" and plate 24 "low" so that the upper beam is deflected to the left and collected by collector anode 27. The lower beam is still undeflected, going to collector anode 22. Thus the "carry" output is given and the absence of current flow to collector anodes 29 or 30 gives a "high" potential for the (0) output (at terminal 83 or 89).

Fig. 4-C shows the addition of (0+1) which gives (1). This addition is brought about with a (0) given as a "low" potential at deflection plate 23 and a (1) as a "low" potential at deflection plate 24. Plates 23 and 24 are thus at the same "low" potential so that the upper beam is undeflected going to collector anode 21, producing a lowered potential thereon and lowering the potential of the deflection plate 25 for the lower beam due to the potential drop across the appropriate resistor. Thus the lower beam is deflected to the right and is collected by collector anode 30. The resulting "low" potential at anode 30 provides the output (1) signal at terminal 83 or 89 (Fig. 3).

Fig. 4-D shows the addition (1+0) which gives (1). An input (1) is given by a "high" potential at deflection plate 23 while the (0) is given by a "high" potential at deflection plate 24. Thus the plates 23 and 24 are again at similar potentials as in the addition of 4-C. Again therefore the upper beam is undeflected, and electron collection by collector anode 21 lowers the potential of deflection plate 25 so that the lower beam is deflected to the right and collected by collector anode 30 for the production of the (1) output signal given by the lowered potential thereon.

Fig. 4-E gives the addition (0+0+carry) the sum of which is (1). The first input (0) is given by a low potential to the deflection plate 23, the second (0) by a high potential to deflection plate 24, and the "carry" by a low potential at deflection plate 26 produced by the application of a carry signal from a preceding stage. In this combination the upper beam is collected by collector anode 28 and the lower beam by collector anode 29. Thus the potential of anode 29 is lowered providing the output (1) indication.

Fig. 4-F gives the addition (1+1+carry) the sum of which is (1+carry). The first input (1) is given by a "high" potential at deflection plate 23 and the second input (1) by a "low" potential at deflection plate 24. The input "carry" is given by a "low" potential at deflection plate 26. In this combination, the upper beam goes to collector anode 27 to provide the output "carry" and the lower beam goes to collector anode 29 to lower the potential thereof providing thereby the (1) output signal.

Fig. 4-G gives the addition (0+1+carry) the sum of which is (0+carry). The input (0) is given by a "low" potential at deflection plate 23 and the input (1) by a "low" potential at deflection plate 24. As before, the input "carry" is given by a "low" potential at deflection plate 26. Plates 23 and 24 are thus at a similar "low" potential so that the upper beam is undeflected being collected by collector anode 21 to lower the potential of deflection plate 25. Thus plates 25 and 26 are also at similar "low" potentials so that the lower beam is undeflected. In summary then, the potential of the collector anodes 29, 30 remains "high" giving an output (0).

Fig. 4-H gives the addition (1+0+c) which again has a sum (0+carry). The input (1) is inserted by the existence of a "high" potential at deflection plate 23. The input (0) is inserted by a "high" potential at plate 24. Again "carry" is inserted by a "low" potential at deflection plate 26. The upper and lower beams are again undeflected; the output (0) being indicated by a "high" potential at the collector anodes 29, 30 and the output "carry" by a "low" potential at collector 32.

As will be surmised, the binary numbers to be added by the tubes 70 to 72, Fig. 3 are supplied to the tube input terminals 50, 64 of stage 1, 51, 65 of stage 2 and 52, 66 of stage 3 from any suitable source. An illustration of a complete source is shown by Fig. 2 to which reference is now made. As has been previously mentioned, the binary input circuit may be of several forms but those shown in Fig. 2 are of the "register" type, a separate group of register circuits for each of the two quantities contained as binary digits to be added, each register providing for numbers with up to three binary digits. The first register circuits include the electron tubes 40—41, 42—43, 44—45, which are paired in conventional Eccles-Jordan circuits. One tube of each pair is cut off at all times, however it may as well be one tube as the other depending upon the input signals supplied to the appropriate grid circuits. The register circuits are storage devices receiving separate negative polarity signals regarding each binary digit at the terminals 46, 47 and 48. These negative polarity signals operate as in the case of the circuit of tubes 40—41, for example, to lower the potential at the grid of tube 41 so that in case the tube 41 is conducting it is immediately brought to the non-conductive condition. However, of course no change takes place if the tube 41 was already non-conductive. Thus each of the trigger circuit pairs can receive separate input signals which may be of short duration, not necessarily simultaneously existent and maintain them for a finite period of time. At the end of this time a negative polarity reset signal from terminal 49 may be simultaneously delivered to the grids of the tubes 40, 42 and 44 so that all of the trigger circuits are brought to a reference condition ready for application of new input signals to the terminals 46, 47 and 48 indicative of binary signals which are to be stored. The anodes of tubes 41, 43 and 45 are connected to output terminals 50, 51 and 52 respectively, for delivery to the previously described tubes 70, 71, 72. Thus the potential at each of the terminals 50, 51 and 52 will exist in one extreme or the other following the application of an input pulse to terminals 46, 47 and 48 to indicate the value of the signals applied.

The second register circuit of Fig. 2, having the paired tubes 55—56, 57—58, and 59—60 may be the same as the first register circuit having Eccles-Jordan type trigger circuits for signal retention receiving input signals at its terminals 61, 62, 63 and supplying output signals at the terminals 64, 65 and 66. Reset signals for the circuits may be applied in parallel as before to the grids of tubes 55, 57 and 59 from the terminal 67. In many cases, of course, where operation of the upper and lower registers of Fig. 2 is more or less synchronized, the reset signals as applied to terminal 67 will be the same as the reset signals previously mentioned as applied to the terminal 49 of the upper register. In fact the terminals 49 and 67 may be connected together. The only difference between the two registers as shown in Fig. 2 lies in the connection of the output terminals 50, 51, 52, 64, 65, and 66. The output terminals for the lower register are connected to anodes opposite from those to which the output terminals are connected in the upper register to give the (0+1) and (1+0) output of (1).

In this circuit of Fig. 2 the register circuits 40—41 and 55—56 may be considered as being allotted to the first or lowest order digit of the numbers to be added, the register circuits of tubes 42—43 and 57—58 as being allotted to the second order digits, and the register circuits of tubes 44—45 and 59—60 being allotted to the third order digit. Thus an adder circuit capable of handling quantities that can be represented by 3 binary digits or the decimal equivalent of 8 is shown. It is of course apparent that any additional number of stages may be included in the registers of Fig. 2 to permit the handling of larger numbers when the circuit includes the additional adder tubes.

As previously discussed in connection with Fig. 3, in the addition (0+0) a false output "carry" signal is delivered by a lowered potential at collector anode 22 (refer to Fig. 4) due to electron collection thereby. This erroneous carry is obtained with the tube interconnections to a 9-pin base as shown by Fig. 1-A. Where the use of a 12-pin base is permissible, the elements may be interconnected as shown in Fig. 5 whereby the false "carry" signal is not given. Fig. 5 will be discussed later but for the tube of Fig. 1-A this erroneous signal may be suppressed quite simply with the auxiliary circuits of Fig. 3 having the triode type tubes 77—78, 85—86, and 91—92 for the tubes 70, 71 and 72 respectively. These suppression circuits are identical for the three tubes so only the first circuit of the tubes 77—78 will be described. It should be noted, however, that where the output "carry" from the last stage, tube 72, is not used, the suppression circuit of tubes 91 and 92 is not necessary.

In the suppression circuits for the first stage, the grids of the electron tubes 77 and 78 are connected through terminals 79 and 80 of Fig. 2 to the grids of tubes 40 and 55 respectively in Fig. 2. The anodes of tubes 77 and 78 are connected to a source of positive potential through resistance 81 and also through a unilateral impedance element 82 to the terminal 73 (33-A). When either of the tubes 40 or 55, or both, are conducting, one or both of the tubes 77—78 are conducting thereby maintaining a low positive potential at the common anode connection of tubes 77, 78 which is lower than the potential produced at terminal 73 by current flow to the collector anode 22-A. In this condition therefore the unilateral impedance element 82 is polarized to prevent current flow from terminal 73 to the anodes of 77—78. On the other hand when both tubes 77 and 78 are cut-off which corresponds to the addition (0+0), unilateral impedance element 82 becomes conductive to prevent the potential at terminal 73 (33-A) from dropping low enough to provide the "carry" indication. The high B+ to which resistance 81 is connected should be adjusted so that the potential at terminal 73 with tubes 77 and 78 off and collector anode 22-A conductive is substantially the same as the potential when tubes 77 and 78 are conducting and collector anode 22-A non-conducting. Thus there is suppressed the undesired "carry" indication which would otherwise be given in the (0+0) addition.

All of the "carry" suppression circuitry can be eliminated by rearranging the internal connections within the tube (of Fig. 1-A) and employing a 12-pin base rather than the 9-pin base as employed with the connections of Fig. 1-A. This 12-pin tube is shown in Fig. 5 to which reference is now made. Fig. 5 is similar in many respects to Fig. 1-A previously discussed, employing the same tube elements or electrodes to which a "grid" electrode 100 has been added. The grid has been placed on this tube primarily for "pulsing," so that the beams are cut-off at all times except when unblocked by a positive pulse applied to the grid 100. Actually the grid is not essential to the operation of the tube and if the "pulsing" operation is not desired the grid may be omitted. In the same vein, it should be understood that a grid electrode similar to 100 could likewise be placed in proximity to the cathode 10 of the tube of Fig. 1-A if "pulsing" of that tube is desired.

In the tube of Fig. 5, heater power is applied to the terminals 107, 108 which through connections not shown apply heater current to maintain an operating temperature at the cathode 113. For simplicity, the heater connections as well as the heater itself, have not been shown in Fig. 5. The cathode itself is brought to a separate connection 105. The previously mentioned grid 100 is placed around the cathode 113, and although it is shown in the modified cross-sectional Fig. 5 as a mere circular member, the grid actually would assume the conventional helical form as employed in grids of electron tubes. The grid is brought to the connection 112 which by way of an external potentiometer 140 is grounded. Across this potentiometer is applied a "pulsing" signal or a D.-C. biasing voltage for current control purposes.

The showing of Fig. 5 includes several components which would normally be placed external to the tube structure. These components are the resistances 141, 142, 143 and 144. The +E voltages indicated as going to terminal 109 and resistances 141, 142, 143 and 144 may be conventional anode voltages of 200–400 volts.

The beam forming plates 114 and 115 are placed around the grid to direct the electrons emitted by the cathode 113 into the "ribbon" beams previously described. These plates are connected together and brought to a terminal 111 to which is applied a controllable D.-C. potential, which by example may be near ground potential, from the potentiometer 141 connected across negative and positive voltages. This merely is a variation over the arrangement of Fig. 1-A wherein the beam plates are permanently connected to the cathode (ground) potential and permits better beam focusing.

The accelerating anode plates 116, 117, 118 and 119, connected together and to collector anodes 128 and 130 are brought to terminal 109 to receive a positive voltage.

The input digit and carry quantities to be added are applied to different deflection plates than in the previous circuit Fig. 1-A. One of the input binary digits is applied to the deflection plate 123 for the upper beam from terminal 104 and has a value of (1) when the potential is high with a value of (0) when the potential is low. The other deflection plate 124 for the upper beam receives the "carry" input signals, applied through terminal 110 where such are given (for all except the first binary digit). "Carry" signals are applied thereto by a "low" potential, with no "carry" input when the potential is high. For the first digit where there is no possibility of a "carry" input, the terminal 110 would normally be connected permanently to a source of "high" potential (+E).

The second binary digit input is delivered to deflection plate 125 from terminal 103, and, like the first binary digit applied to terminal 104 is delivered in the value (1) by a "high" potential and in the value (0) by a low potential. Thus there is an important difference between the tube of this Fig. 5 and that of the previously discussed Fig. 1-A where the input binary digit quantities were delivered to the plates 23 and 24 in opposing potential values. Although this difference must be taken into consideration, as a practical matter it offers no difficulty because with register circuits such as those of Fig. 2, signals of either polarity are readily available. Typically then, instead of the registers of Fig. 2 supplying output signals of opposing values for their digits, they would both supply the same values to which end the terminals 64, 65 and 66, respectively would be connected to the anodes of tubes 56, 58 and 60 instead of the anodes of tubes 55, 57 and 59. It goes without saying that when the registers of Fig. 2 are used with a tube of Fig. 5, the suppression terminals 79, 80, 87, 88, 93 and 94 are not required.

Two outputs are obtained from the tube of Fig. 5. The first of these, the digit output is obtained from collector anode 122, which is brought to terminal 101 and connected to a source of positive potential (+E) through resistance 142. Thus when the lower beam is undeflected, electron flow to collector anode 122 produces a voltage drop across resistance 142 to lower the potential at terminal 101 and thereby give the binary digit output value of (1). When the lower beam is deflected so that it is not collected by anode 122, a high potential at terminal 101 gives the binary digit output value of (0).

The second output of the tube is the "carry" output which is realized whenever the upper beam is deflected to fall on collector anode 127 or the lower beam is deflected to fall on collector anode 129. Both collector anodes 127 and 129 are connected together and brought to terminal 102 which in turn is provided with a positive potential through resistance 143. Thus current flow to either collector anode 127 or 129 lowers the potential at terminal 102 to give the "carry" signal. When neither collector anode 127 or 129 is conductive, a high potential at terminal 102 indicates the absence of a "carry" signal. It will be noted that these values of output "carry" correspond to the input "carry" values previously discussed at terminal 110.

There are several additional connections within the tube which have not been discussed. These connections are those of the central collector anode 121 and the deflection plate 126 to terminal 106. The terminal 106 in turn is connected through resistance 144 to a positive potential (+E). The result of these connections is that the deflection plate 126 is high when the central collector anode 121 is nonconductive, and low when collector anode 121 is conductive.

The overall results of all of these interconnections for various combinations of input binary digits and the "carry" signals are summarized in Fig. 6. Fig. 6 is similar to the previously discussed Fig. 4 however there are of necessity some differences in the combinations. With reference now to Fig. 6 a brief discussion of the information contained therein may be given.

In Fig. 6-A, the addition (0)+(0) giving (0), there is no input "carry," thus deflection plate 124 is high, and the two input binary values (0) and (0) are given by low potentials at deflection plates 123 and 125. Thus the upper beam is collected by anode 128 and the deflection plate 126 remains high. The lower beam is collected by anode 130. Thus anodes 127 and 129 are nonconductive so there is no "carry" output. Similarly collector anode 122 is not conductive so that the digit output is (0).

In Fig. 6-B, the addition (1)+(1) is given having the output value of (0)+"carry." The input values of (1) are given by "high" potentials at plates 123 and 125 and the absence of an input "carry" by a "high" potential at plate 124. In this condition therefore, both plates 123 and 124 are at the same potential so that the upper beam is undeflected, being collected by anode 121 to lower the potential of plate 126. Thus the lower beam is deflected to collector plate 129 to provide a "carry" output.

In Fig. 6-C, the addition (1)+(0) is given having the output value of (1). The input (1) is given by a high potential at plate 123, the (0) by a low potential at plate 125 and no "carry" by a high potential at plate 124. Both plates 123 and 124 are thus at similar potentials so that the upper beam is undeflected thus lowering the potential of plate 126 so that plates 125 and 126 are at the same potential. The lower beam is thus undeflected so the output (1) is given by current flow to anode 122.

In Fig. 6-D, the addition (0)+(1) is given having the output value (1). The input (0) is given by a low potential at plate 123, the (1) by a high potential at plate 125 and no "carry" by a high potential at plate 124. The upper beam is therefore deflected to be collected by anode 128 and the lower beam is undeflected to be collected by anode 122 giving the output (1).

Fig. 6-E introduces the "carry" input given in Figs. 6-E through 6-H by a low potential at deflection plate 124. In 6-E the addition (0)+(0)+carry has the output value (1). The (0)+(0) inputs are given by "low" potentials at plates 123 and 125. Thus the upper beam is undeflected, collected by anode 121 lowering the potential at plate 126. The lower beam is also undeflected, going to collector anode 122 to provide the (1) output.

In Fig. 6-F the addition (1)+(1)+"carry" is given having the value (1)+"carry." The (1)+(1) inputs are given by high potentials at plates 123 and 125 so that the upper beam is deflected to collector anode 127 to give the "carry" output and the lower beam undeflected give the (1) output at anode 122.

Fig. 6-G gives the addition (1)+(0)+"carry" having the value (0)+"carry." The input (1) is given by a high potential at plate 123 and the (0) is given by a low potential at plate 125. With this input combination the upper beam is deflected to anode 127 giving the "carry" and the lower beam to anode 130 so that anode 122 remains "high" to give (0) as an output.

Fig. 6-H gives the addition (0)+(1)+carry having the value (0)+"carry." The input (0) is given by a "low" potential at plate 123 and the input (1) by a "high" potential at plate 125. In this combination the upper beam is undeflected so that it is collected by anode 121 to lower the potential of deflection plate 126 to deflect the lower beam to collector anode 129 providing thereby the output "carry."

The tube of Fig. 5 and its operation have been described quite thoroughly. Where stages are cascaded the only interconnections are those for the "carry" input and "carry" output, both of which are self-evident. One tube of Fig. 5 will of course be required for each binary digit to be handled.

It should also be noted that the words "high" and "low" have been used quite loosely and on a relative basis only. In general such is quite adequate but to tie down these terms, the "high" value may be considered as approximately equal to (+E) which as previously exemplified may be between 200 and 400 volts. The low potential is substantially below (+E) typically lower by 50 to 150 volts.

The structure of the tubes may be altered considerably from that shown in the Figs. 1-A and 5. This point has already been discussed briefly in connection with Fig. 1-A however it should be understood that instead of having a centrally located cathode, with the two tube sections mutually opposite in substantially the same plane, the two sections could be "stacked," one above the other having a single cathode offset from the center of the electron tube envelope and in which plates 116-118 and 117-119 are continuous extending through into both sections.

In conclusion it should be realized that even though the electron tube structure of the present invention has been described in only one specific novel circuit, it is not limited to that particular circuit but may be employed in other circuits whenever convenient, such for example, coincidence establishing circuits. The tube structure employed is inherently of a stable nature little affected by vibration or aging. The plate "type" structure of the elements is inherently rigid and not prone to microphonics. The electron beams are not intensity modulated with signal variations which must appear with high fidelity in the output, but are switched from one collector anode to another. Thus variations in electron flow due to aging, fluctuations in heater voltage, or other causes have little effect on tube operation. The net result is a tube structure having long life, high stability and which does not require extremely close tolerances in manufacture.

Although certain specific embodiments of this invention have been disclosed and described it is to be understood that they are merely illustrative of this invention and modifications may, of course, be made without departing from the spirit and scope of the invention.

The invention described herein may be manufactured and used by or for the Government of the United States of America for governmental purposes without the payment of any royalties thereon or therefor.

What is claimed is:

1. An electron tube for adding first and second binary signals and a carry signal comprising, a cathode surface for providing electron emission, beam forming means for concentrating emitted electrons into two electron beams, first electron collector plates for each beam positioned in the respective, undeflected paths of said beams to collect undeflected electrons, secondary collector plates for each beam positioned outside the undeflected paths of said beams on opposing sides of the first collector plates operative to collect deflected electrons, the first electron collector plates associated with each of said beams being conductively isolated from the secondary collector plates associated with the corresponding beam, deflection means for each electron beam disposed between the beam forming means and the collector plates operative to deflect the electron beams to fall exclusively on either the first or the secondary collector plates in dependency on applied signals, means for applying two of the aforementioned signals to the deflection means of a first electron beam to produce a predetermined deflection therein dependent on the two applied signals, a connection between the first electron collector plate of said first electron beam and the deflection means for the other electron beam, means applying the other of the aforementioned signals to the deflection means of said other electron beam, and means connecting a secondary collector plate of said first electron beam to one of the collector plates of said other electron beam.

2. An electron tube for adding first and second binary signals and a carry signal comprising, means producing dual electron beams, first electron collector plates for each beam positioned in the respective, undeflected paths of said beams to collect undeflected electrons, secondary collector plates for each beam positioned outside the undeflected paths of said beams on opposing sides of the first collector plates operative to collect deflected electrons, the first electron collector plates associated with each of said beams being conductively isolated from the secondary collector plates associated with the corresponding beam, deflection means for each electron beam disposed between the beam forming means and the collector plates operative to deflect the electron beams to fall exclusively on either the first or the secondary collector plates in dependency on applied signals, means for applying two of the aforementioned signals to the deflection means of a first electron beam to produce a predetermined deflection therein dependent on the two applied signals, a conductive path connecting the first electron collector plate of said first electron beam with the deflection means for the other electron beam, means applying the other of the aforementioned signals to the deflection means of said other electron beam, and means connecting a secondary collector plate of said first electron beam to one of the collector plates of said other electron beam.

3. An electron tube comprising, a cathode surface for providing electron emission, beam forming means for concentrating emitted electrons into two electron beams, first electron collector plates for each beam positioned to collect undeflected electrons, secondary collector plates for each beam positioned beside the first collector plates operative to collect deflected electrons, deflection means for each electron beam disposed between the beam forming means and the collector plates operative to deflect the electron beams to fall on selected collector plates in dependency on applied signals, a conductive path connecting the first electron collector plate for one beam with the deflection means for the other beam, and a conductive path connecting a secondary collector plate for the first beam with a collector plate for the second beam.

4. A binary quantity adder apparatus comprising, a dual energy beam device, means exerting unit deflecting forces on a first beam in accordance with one binary quantity to be added, means exerting second unit deflecting forces on the first beam in accordance with a second binary quantity to be added, the digits of said first and second binary quantities of like value providing deflections of like sense and of unlike values providing deflections of opposite sense, first collector means positioned in the undeflected path of the first beam for collecting said first beam only when the binary quantities are of values so that deflecting forces are of opposite sense, a pair of second collector means positioned outside the undeflected path of the first beam for collecting said first beam only when the deflecting forces for the first beam are of like sense, said first collector means being conductively isolated from said second collector means, means exerting unit deflecting forces on the second beam in accordance with energy collected by the first collector means, means exerting second unit deflecting forces on the second beam in accordance with a third input binary type quantity, third collector means positioned in the undeflected path of the second beam for collecting said second beam only when the deflecting forces therefor are of opposite sense fourth collector means positioned outside the undeflected path of the second beam for collecting said second beam only when the deflecting forces for the second beam are of like sense, said third collector means being conductively isolated from said fourth collector means, and means connecting one of the second collector means to one of the collector means for the second electron beam.

5. An electrical apparatus for adding binary quantities comprising, means for generating first and second electron beams, means for applying two equal amplitude deflecting forces to the first electron beam in polarity dependent upon first and second binary quantities to be added, first electron collector means centrally disposed to collect the first electron beam only when deflecting forces impressed thereon are of equal amplitude and opposing polarity, a pair of second electron collector means for the first electron beam disposed adjacent to the first electron collector means but conductively isolated therefrom operative to collect the first electron beam only when the deflection forces impressed thereon are of equal amplitude and additive polarity, a signal developing impedance element connected to the first electron collector means operative to develop a control signal having one value when the first electron beam is collected by the first collector means and another value when it is not collected thereby, means for applying two equal amplitude deflecting forces to the second electron beam in polarity dependent upon the value of the control signal and a third binary quantity to be added, third electron collector means for the second beam centrally disposed to collect the second electron beam only when deflecting forces applied thereto are of opposing polarity, fourth electron collector means for the second electron beam disposed adjacent to the third electron collector means but conductively isolated therefrom operative to collect the second electron beam only when the deflection forces impressed thereon are of equal amplitude and additive polarity, means connecting one of the second electron collector means to one of the collector means for the second electron beam, and a signal developing impedance element connected to the fourth electron collector means operative to develop output signals depending upon electron collection by the fourth electron collector means.

6. In combination, an electron tube for adding first and second binary signals and a carry signal comprising, an electron emitter for producing a pair of discrete electron beams, a separate deflection system for each beam for controlling the paths of travel thereof, first anode collector means for each beam respectively disposed in the undeflected paths of each of said beams, second anode collector means for each beam respectively disposed in the deflected paths of each of said beams and outside the undeflected paths thereof, the first anode collector means associated with each of said beams being conductively isolated from the second anode collector means associated with the corresponding beam, and means for applying two of the aforementioned signals to the deflection system of a first electron beam to produce a predetermined deflection therein dependent on the two applied signals, means connecting the first anode collector means of said first electron beam to the deflection system of the other electron beam to control the path of said other beam, means applying the other of the aforementioned signals to the deflection system of said other electron beam, and means connecting said second anode collector means of said first electron beam to one of the collector means of said other electron beam.

References Cited in the file of this patent

UNITED STATES PATENTS

| | | |
|---|---|---|
| 2,235,497 | Heil | Mar. 18, 1941 |
| 2,262,406 | Rath | Nov. 11, 1941 |
| 2,376,882 | Olken | May 29, 1945 |
| 2,402,188 | Skellett | June 18, 1946 |
| 2,417,450 | Sears | Mar. 18, 1947 |
| 2,424,289 | Snyder, Jr. et al. | July 22, 1947 |
| 2,435,841 | Morton | Feb. 10, 1948 |
| 2,436,677 | Snyder | Feb. 24, 1948 |
| 2,445,215 | Flory | July 13, 1948 |
| 2,446,945 | Morton | Aug. 10, 1948 |
| 2,472,779 | Selgin | June 7, 1949 |
| 2,537,923 | Van Overbeek | Jan. 9, 1951 |
| 2,547,215 | Jonker et al. | Apr. 3, 1951 |
| 2,553,735 | Adler | May 22, 1951 |
| 2,615,142 | Adler | Oct. 12, 1952 |

FOREIGN PATENTS

| | | |
|---|---|---|
| 220,297 | Great Britain | Nov. 30, 1925 |